US012793178B2

(12) United States Patent
Yu et al.

(10) Patent No.: US 12,793,178 B2
(45) Date of Patent: Nov. 10, 2026

(54) METHOD AND APPARATUS WITH SUPER-SAMPLING

(71) Applicant: SAMSUNG ELECTRONICS CO., LTD., Suwon-si (KR)

(72) Inventors: Hyeonseung Yu, Suwon-si (KR); Jaeyoung Moon, Suwon-si (KR); Inwoo Ha, Suwon-si (KR); Nahyup Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 18/541,424

(22) Filed: Dec. 15, 2023

(65) Prior Publication Data

US 2024/0320793 A1 Sep. 26, 2024

(30) Foreign Application Priority Data

Mar. 21, 2023 (KR) ........................ 10-2023-0036561

(51) Int. Cl.
*G06T 5/50* (2006.01)
*G06T 3/18* (2024.01)
(Continued)

(52) U.S. Cl.
CPC .................. *G06T 5/50* (2013.01); *G06T 3/18* (2024.01); *G06T 3/4046* (2013.01); (Continued)

(58) Field of Classification Search
CPC ........... G06T 5/50; G06T 3/18; G06T 3/4046; G06T 3/4053; G06T 5/90; G06T 7/20; (Continued)

(56) References Cited

U.S. PATENT DOCUMENTS 10,701,394 B1 * 6/2020 Caballero ............ H04N 19/577
11,367,165 B2 * 6/2022 Xiao ..................... G06T 3/4053
(Continued)

FOREIGN PATENT DOCUMENTS

CN 113643186 A * 11/2021 ............... G06T 5/00
CN 113947528 A * 1/2022 ............ G06N 3/045
(Continued)

OTHER PUBLICATIONS

Sajjadi, Mehdi SM, et al., "Frame-Recurrent Video Super-Resolution." Proceedings of the IEEE conference on computer vision and pattern recognition. 2018., (9 pages).
(Continued)

*Primary Examiner* — Chan S Park
*Assistant Examiner* — Woo C Rhim
(74) *Attorney, Agent, or Firm* — Morgan, Lewis & Bockius LLP

(57) ABSTRACT

A processor-implemented method including merging a first super-sampled image frame, having been generated at a first time point, with a second input image frame corresponding to a super-sampling target for a second time point to generate a merged image and generating a second super-sampled image frame by performing a super-sampling operation at the second time point that includes increasing a bit-precision of a result of an executing, by the processor, of a super-sampling neural network model provided a decreased bit precision of the merged image.

17 Claims, 14 Drawing Sheets

(51) Int. Cl.

| | |
|---|---|
| ***G06T 3/4046*** | (2024.01) |
| ***G06T 3/4053*** | (2024.01) |
| ***G06T 5/90*** | (2024.01) |
| ***G06T 7/20*** | (2017.01) |

(52) U.S. Cl.
CPC .............. *G06T 3/4053* (2013.01); *G06T 5/90* (2024.01); *G06T 7/20* (2013.01); *G06T 2207/20081* (2013.01); *G06T 2207/20084* (2013.01); *G06T 2207/20221* (2013.01)

(58) Field of Classification Search
CPC . G06T 2207/20081; G06T 2207/20084; G06T 2207/20221; G06T 2207/10016; G06T 5/60; G06T 5/92; G06T 2207/20208; G06T 1/20; G06T 1/60; G06T 3/4076; G06T 15/10
See application file for complete search history.

(56) References Cited

U.S. PATENT DOCUMENTS

| | | | | |
|---|---|---|---|---|
| 2006/0242461 | A1* | 10/2006 | Kondo | G06F 11/1658 714/21 |
| 2011/0216078 | A1* | 9/2011 | Blinzer | G09G 5/363 345/502 |
| 2016/0358314 | A1* | 12/2016 | Ji | H04N 19/36 |
| 2017/0242602 | A1* | 8/2017 | Demchenko | G06F 8/41 |
| 2018/0074980 | A1* | 3/2018 | Kawahara | G06F 3/065 |
| 2019/0206026 | A1* | 7/2019 | Vemulapalli | G06T 3/18 |
| 2020/0365118 | A1* | 11/2020 | Zhang | G06T 1/60 |
| 2020/0394772 | A1* | 12/2020 | Afra | G06T 5/60 |
| 2021/0390664 | A1* | 12/2021 | Pohl | G06T 11/40 |
| 2022/0004798 | A1* | 1/2022 | Zhu | G06T 5/70 |
| 2022/0101497 | A1* | 3/2022 | Ryan | H04N 23/951 |
| 2022/0108421 | A1* | 4/2022 | Shacklett | G06T 3/4046 |
| 2022/0385911 | A1* | 12/2022 | Ferrara | H04N 19/146 |
| 2022/0405987 | A1* | 12/2022 | Pottorff | G06T 7/90 |
| 2023/0025778 | A1* | 1/2023 | Shoa Hassani Lashdan | H04N 19/139 |
| 2023/0095237 | A1* | 3/2023 | Kim | G06T 7/248 382/275 |
| 2023/0118802 | A1* | 4/2023 | Gong | G06N 3/08 706/25 |
| 2023/0146073 | A1* | 5/2023 | Kozlov | G06N 3/084 382/298 |
| 2023/0177649 | A1* | 6/2023 | Massal | G06T 7/20 |
| 2023/0196662 | A1* | 6/2023 | Kaskela | G06N 3/0464 345/611 |
| 2023/0206394 | A1* | 6/2023 | Janis | G06T 11/001 345/595 |
| 2024/0029196 | A1* | 1/2024 | Barragán del Rey | G06T 3/4046 |
| 2024/0096050 | A1* | 3/2024 | Ouyang | G06T 5/70 |
| 2024/0161233 | A1* | 5/2024 | Moon | G06T 3/4046 |
| 2024/0161236 | A1* | 5/2024 | Jung | G06T 3/4053 |
| 2024/0242314 | A1* | 7/2024 | O'Neil | G06T 5/60 |
| 2024/0265494 | A1* | 8/2024 | Rajasankar | G06T 7/248 |
| 2024/0320793 | A1* | 9/2024 | Yu | G06T 5/50 |
| 2025/0104186 | A1* | 3/2025 | Cohen | G06N 3/09 |

FOREIGN PATENT DOCUMENTS

| | | | | |
|---|---|---|---|---|
| KR | 102307622 | B1 * | 10/2021 | G06N 3/08 |
| KR | 10-2022-0153001 | A | 11/2022 | |
| WO | WO-2023025245 | A1 * | 3/2023 | G06N 3/045 |

OTHER PUBLICATIONS

Thomas, Manu Mathew, et al. "A Reduced-Precision Network for Image Reconstruction." ACM Transactions on Graphics (TOG) 39.6 (2020): 1-12.

Extended European search report issued on Sep. 13, 2024, in counterpart European Patent Application No. 24164129.9 (29 pages).

* cited by examiner

METHOD AND APPARATUS WITH SUPER-SAMPLING

CROSS-REFERENCE TO RELATED APPLICATIONS

This application claims the benefit under 35 USC § 119(a) of Korean Patent Application No. 10-2023-0036561, filed on Mar. 21, 2023, in the Korean Intellectual Property Office, the entire disclosure of which is incorporated herein by reference for all purposes.

BACKGROUND

1. Field

The following description relates to a method and apparatus with super-sampling.

2. Description of Related Art

Super-sampling may be a method of generating a high-resolution image with high quality by removing an aliasing effect occurring in a low-resolution image. Super-sampling may be performed in real-time by using deep learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provide a processor-implemented method of a processor including merging a first super-sampled image frame, having been generated at a first time point, with a second input image frame corresponding to a super-sampling target for a second time point to generate a merged image and generating a second super-sampled image frame by performing a super-sampling operation at the second time point that includes increasing a bit-precision of a result of an executing, by the processor, of a super-sampling neural network model provided a decreased bit precision of the merged image.

The method may include generating the merged image by mixing pixels of the first super-sampled image frame and pixels of the second input image frame based on determined change data and determining the change data corresponding to a change between the second input image frame and a first input image frame corresponding to a super-sampling target at the first time point.

The generating of the merged image may include applying a corresponding pixel of the second input image frame to a position satisfying a replacement condition among pixel positions of the merged image and warping and applying a corresponding pixel of the first output image frame to a position violating the replacement condition among the pixel positions of the merged image using the change data.

The generating a second super-sampled image frame may include generating a first temporary image having a narrower dynamic range than the merged image by performing tone mapping on the merged image and generating a second temporary image having lower bit-precision than the first temporary image by performing data type conversion on the first temporary image.

The method may include performing buffer layout conversion on the second temporary image to determine network input data, where the network input data has a depth characteristic layout instead of a spatial characteristic layout of the second temporary image.

The merged image may be expressed as a real number data type, and the network input data may be expressed as an integer number data type.

The decreasing of the bit-precision is performed by a first processor, the increasing of the bit-precision is performed by a second processor, and the first processor is one among a first plurality of processors and the second processor is one among a different plurality of second processors.

The method may include storing the network input data in a first memory space of the first processor and duplicating the network input data from the first memory space to a second memory space of the second processor while an operation of the first processor is stopped.

The method may include storing the network output data in the second memory space and duplicating the network output data from the second memory space to the first memory space while the operation of the first processor is stopped, in response to the duplication of the network output data being completed, the operation of the first processor is resumed.

The method may include rendering the second input image frame at the second time point, and, according to an asynchronous pipeline method, the first output image frame is displayed at the second time point instead of the first time point when the first output image frame was generated, and the second output image frame is displayed at a third time point instead of the second time point.

The second output image frame has higher quality than the second input image frame.

In a general aspect, here is provided an electronic device including a first processor configured to merge a first super-sampled image frame, having been generated at a first time point, with a second input image frame corresponding to a super-sampling target for a second time point to generate a merged image and generate a second super-sampled image frame by performing a super-sampling operation at the second time point that includes increasing a bit-precision of a result of an executing, by the processor, of a super-sampling neural network model executed by a second processor provided a decreased bit precision of the merged image.

To generate the merged image, the first processor may be configured to generate the merged image by mixing pixels of the first output image frame and pixels of the second input image frame based on determined change data and determine the change data corresponding to a change between the second input image frame and a first input image frame corresponding to a super-sampling target at the first time point.

The first processor may be configured to apply a corresponding pixel of the second input image frame to a position satisfying a replacement condition among pixel positions of the merged image and warp and apply a corresponding pixel of the first output image frame to a position violating the replacement condition among the pixel positions of the merged image using the change data.

The first processor may be configured to generate a first temporary image having a narrower dynamic range than the merged image by performing tone mapping on the merged image and generate a second temporary image having lower bit-precision than the first temporary image by performing data type conversion on the first temporary image.

The first processor may be configured to determine network input data based on the decreased bit-precision, store the network input data is stored in a first memory space of the first processor, and duplicate the network input data from the first memory space to a second memory space of the second processor while an operation of the first processor is stopped.

The first processor may be configured to render the second input image frame at the second time point, and, according to an asynchronous pipeline method, the first output image frame is displayed at the second time point instead of the first time point, and where the second output image frame is displayed at a third time point instead of the second time point.

In a general aspect, here is provided a processor-implemented method including merging a first super-sampling image result at a first time point with a second image target at a second time point to generate a merged image and generate a super-sampled second output image at the second time point by increasing a bit-precision provided a super-sampling neural network provided a decreased bit-precision image of the merged image.

The merging may include determining change data corresponding to a change between the second image target and a super-sampling target at the first time point and mixing pixels of the first output image frame and pixels of the second input image frame based on the change data to determine the merged image.

Other features and aspects will be apparent from the following detailed description, the drawings, and the claims.

Figure 1:
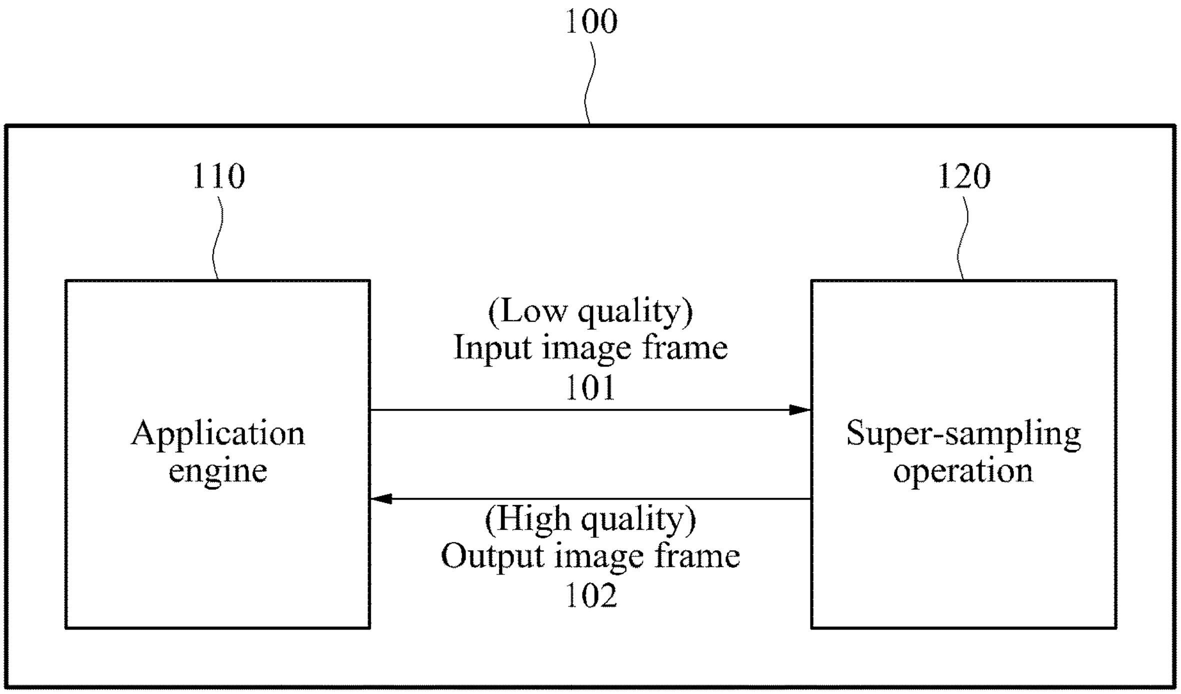
FIG. 1 illustrates an example electronic apparatus according to one or more embodiments.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

A machine learning model (e.g., a neural network through deep learning) may be trained to perform an inference according to a trained purpose or task. For example, a neural network may be trained to intuitively map input data and output data onto each other in a nonlinear relationship. As a non-limiting example, a neural network may be trained to infer a super-sampling result of an input image.

FIG. 1 illustrates an example electronic apparatus according to one or more embodiments. Referring to FIG. 1, in a non-limiting example, an electronic apparatus 100 may include an application engine 110 which may generate an input image frame 101. The application engine 110 may provide a video including a plurality of consecutive image frames. One image frame of the video may be determined based on the input image frame 101. In an example, the application engine 110 may be a game engine and the video may be provided as a game screen to a display.

In a non-limiting example, the image quality of image frames may be enhanced through super-sampling operation 120. Through the super-sampling operation 120, the input image frame 101 with low resolution may be converted into an output image frame 102 with high resolution. The input image frame 101 may be a target of the super-sampling operation 120 and the output image frame 102 may be a result of the super-sampling operation 120. Depending on the type of the application engine 110, an image frame may be referred to as texture.

The input image frame 101 may be a rendering result of the application engine 110, and an output video may be determined through the output image frame 102. The application engine 110 may render a plurality of input image frames, and a plurality of output image frames may be generated based on the super-sampling operation 120 on the plurality of input image frames. The application engine 110 may perform post-processing on the plurality of output image frames and may display the plurality of output image frames as a video output.

The super-sampling operation 120 may be a machine learning model (e.g., a neural network) trained to perform super-sampling. The machine learning model used for the super-sampling operation 120 may be a neural reconstruction model. The machine learning model may perform reconstruction, such as a denoise operation, on a network input image and may remove artifacts from the network input image. The machine learning model may be made up of several machine learning models.

A machine learning model may include a deep neural network (DNN) including a plurality of layers. In a non-limiting example, the DNN may include at least one of a fully connected network (FCN), a convolutional neural network (CNN), or a recurrent neural network (RNN). In an example, at least a portion of the layers included in the neural network may correspond to a CNN and the other portion of the layers may correspond to an FCN. The CNN may be referred to as convolutional layers and the FCN may be referred to as fully connected layers. According to one embodiment, the machine learning model including a neural encoder and a neural decoder may be a neural auto encoder.

In an example, the neural network may be trained based on deep learning, and then after training, perform an inference or inferences for the purpose of training by intuitively mapping, to each other, input and output through a nonlinear relationships. Deep learning is a machine learning technique for solving a problem such as image or speech recognition from a big data set, as a non-limiting example. In an example, deep learning may be construed as an optimization problem solving process of finding a point at which energy loss, or cost, is minimized while training a neural network using prepared training data. Through supervised, unsupervised learning, or reinforcement training, of deep learning, a structure of the neural network or parameters and hyper-parameters corresponding to a model may be derived. The parameters may include connection weighting (weights) between respective multiple layers of a plurality of layers of the neural network. If the width (e.g., number of nodes in layers(s)) and the depth (e.g., number of layers) of the neural network are sufficiently large, the neural network may have a capacity sufficient to implement a predetermined function. The neural network may achieve an optimized performance (e.g., meetin an accuracy threshold) when learning from a sufficiently large amount of training data through an appropriate training process.

In one or more example, the neural network may have been previously been trained for the particular tasks (e.g., super-sampling), or such above training may be initially performed before the neural network is used for inference operations. That the neural network has been trained means that the neural network is ready for inference, i.e., inferences are operations of trained models. In an example, a "start", implementation, or execution of the neural network" may include loading the neural network into a memory or that input data for inference is input or provided to the neural network after the neural network is loaded into the memory.

Figure 2:
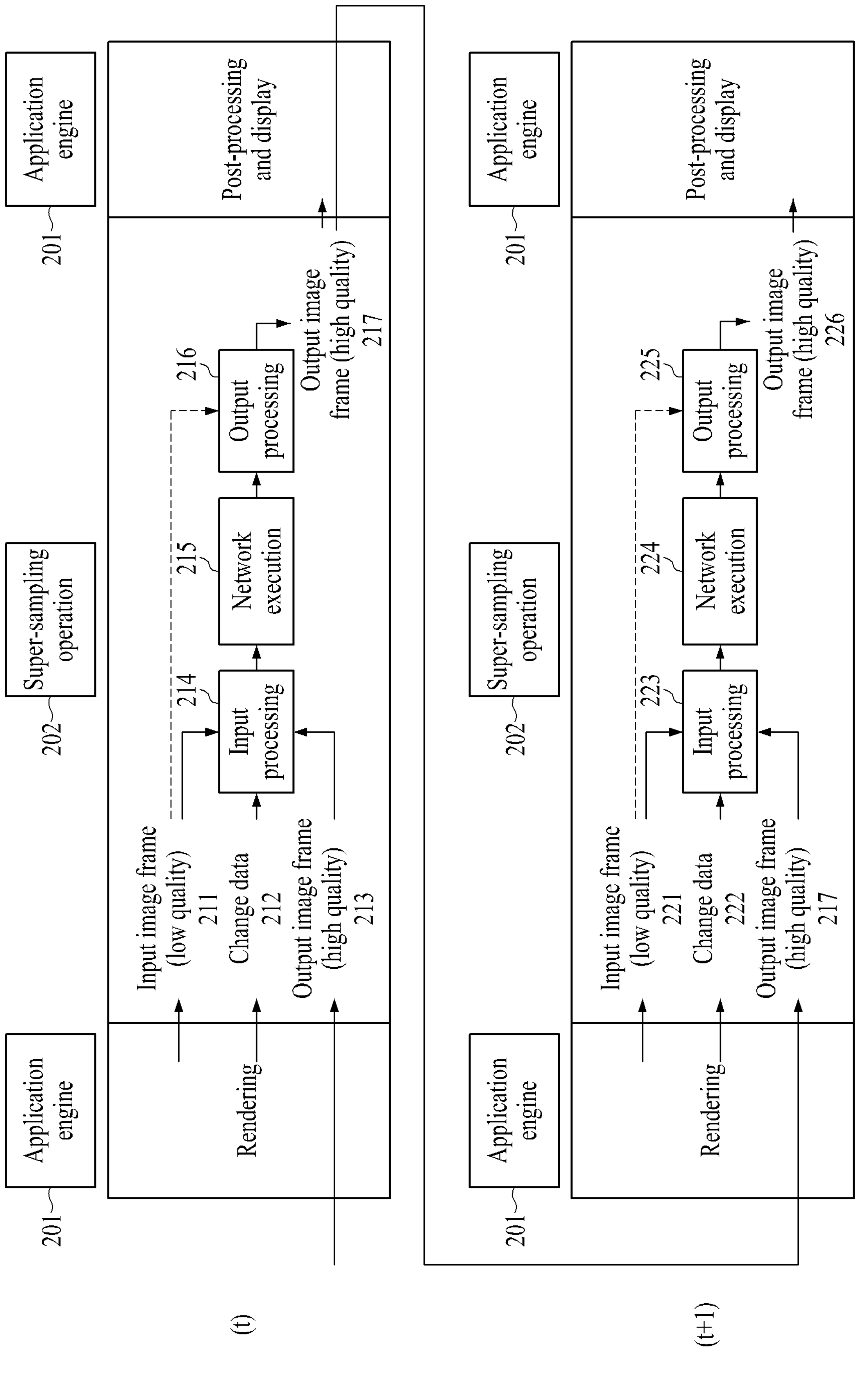
FIG. 2 illustrates an example method with super-sampling according to one or more embodiments.

FIG. 2 illustrates an example method with super-sampling according to one or more embodiments. Referring to FIG. 2, in a non-limiting example, an application engine 201 may generate an input image frame 211 as a rendering result at a t-th time point. The application engine 201 may generate change data 212 representing a difference between a rendering result at a t−1-th time point and a rendering result at the t-th time point. The change data 212 may include motion vectors of corresponding pixels of the rendering result at the t−1-th time point and the rendering result at the t-th time point.

In a non-limiting example, a super-sampling operation 202 may include input processing 214 operation, network execution 215 operation, and output processing 216 operation. The network execution 215 includes the execution of the example trained super-sampling neural network. Through the input processing 214, the network input data used for the network execution 215 may be determined. A merged image may be generated based on the input image frame 211, the change data 212, and an output image frame 213, and the network input data may be determined by adjusting bit-precision of the merged image. Detailed operations related to input processing 214 are described in greater detail below.

Network output data may be generated through the network execution 215. In an example, the super-sampling neural network model may generate the network output data based on the network input data. Image quality may be enhanced through network execution 215. Detailed operations related to network execution 215 are described in greater detail below. The bit-precision of the network output data may be adjusted through output processing 216. An output image frame 217 corresponding to a result of super-sampling the input image frame 211 at the t-th time point may be generated. Detailed operations related to output processing 216 are described in greater detail below.

In an example, the network execution 215 may be performed by a processor (e.g., a neural processing unit (NPU) or other processor) processing operations of the super-sampling neural network model. In an example, the processor may perform multiply-accumulate (MAC) operations that may make up a large percentage in the operations of the super-sampling neural network model. In an example, a data format specialized in the application engine 201 may be converted into a data format specialized in the network execution 215 through the input processing 214. A data format specialized in the network execution 215 may be converted into a data format specialized in the application engine 201 through the output processing 216.

In an example, data that is used for the network execution 215 may have a bit-precision that is relatively low compared to the precision of the data used for the application engine 201. In an example, a real data type may be used for the application engine 201 and an integer data type may be used for the network execution 215. The real data type may be a float data type. Based on the relatively low precision of the bit-precision data, the super-sampling operation 202 may be utilized in environments where there are limited resources available resources, such as in a mobile environment.

The application engine 201 may perform post-processing on the output image frame 217 and may display the output image frame 217. The output image frame 217 may be a result of super-sampling at the t-th time point and may be used for the super-sampling operation 202 at the t+1-th time point.

In an example, the application engine 201 may generate an input image frame 221 as a result of rendering at the t+1-th time point. The input image frame 211 at the t-th time point may be an N-th frame and the input image frame 221 at the t+1-th time point may be an N+1-th frame. The application engine 201 may generate change data 222 representing the difference between a rendering result at the t-th time point and a rendering result at the t+1-th time point. In an example, the change data 222 may include motion vectors of corresponding pixels of the rendering result at the t-th time point and the rendering result at the t+1-th time point.

Input processing 223 may be performed based on the input image frame 221, the change data 222, and the output image frame 226. Network execution 224 may be performed based on the network input data upon input processing 223, and output processing 225 may be performed based on the network output data upon network execution 224. An output image frame 226 may be generated based on the output processing 225.

The application engine 201 may perform post-processing on the output image frame 226 and may display the output image frame 226. The output image frame 226 may be a result of super-sampling at the t-th time point and may be used for the super-sampling operation 202 at the t+1-th time point. In the output video displayed by the application engine 201, the output image frame 217 at the t-th time point may be the N-th frame and the output image frame 226 at the t+1-th time point may be the N+1-th frame.

In an example, training of the super-sampling neural network may use training data of input images, and in an example may also further perform input and output processings 214 and 220.

Figure 3:
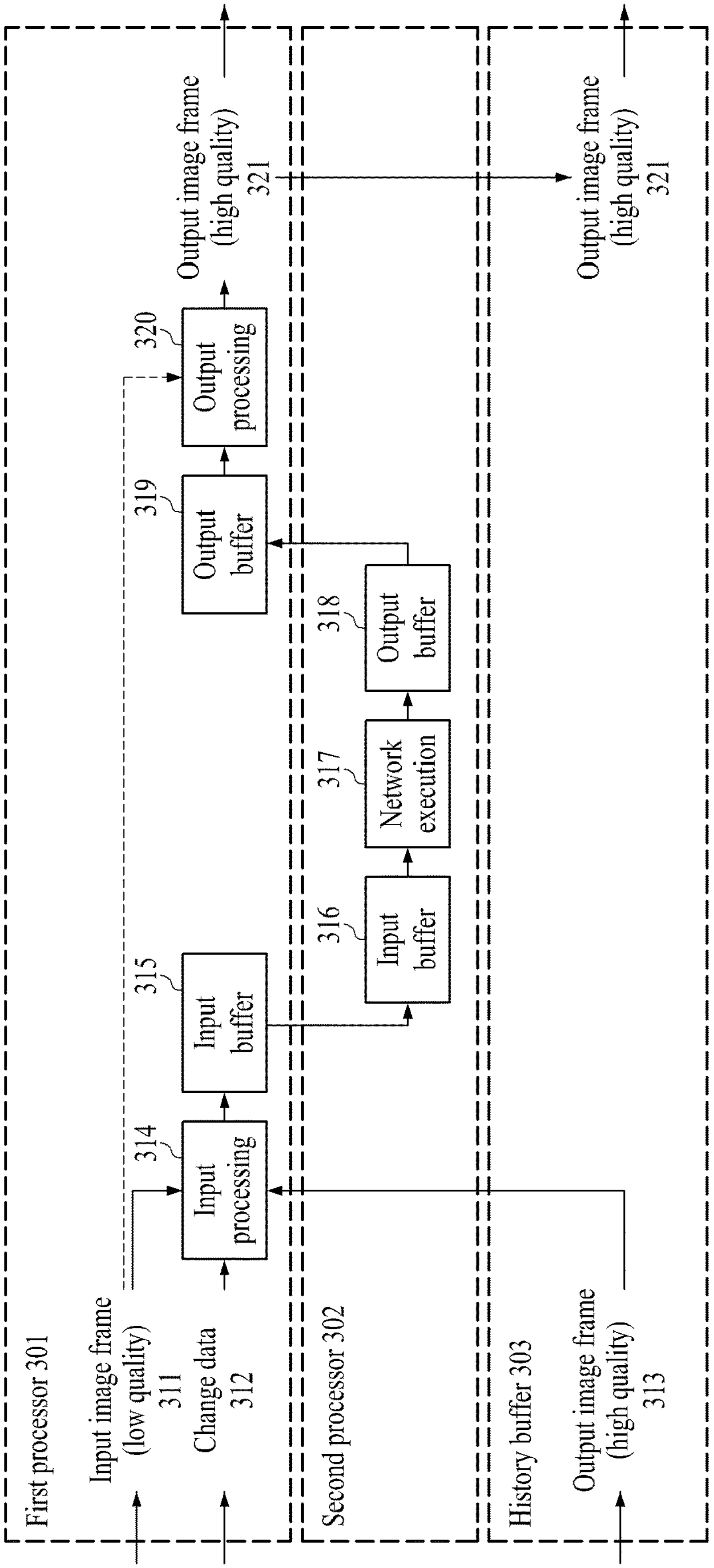
FIG. 3 illustrates an example method with super-sampling according to one or more embodiments.

FIG. 3 illustrates an example method of super-sampling, according to one or more embodiments. Referring to FIG. 3, in a non-limiting example, among input processing 314, network execution 317, and output processing 320 of super-sampling, input processing 314 and output processing 320 may be performed by a first processor 301 and network execution 317 may be performed by a second processor 302. In an example, the first processor 301 may be used to determine network input data and the second processor 302 may be used to generate network output data. The first processor 301 and the second processor 302 may be different types of processors. For example, the first processor 301 may be a graphics processing unit (GPU) and the second processor 302 may be an NPU.

The first processor 301 may perform input processing 314 based on an input image frame 311, change data 312, and an output image frame 313. The output image frame 313 may be loaded from a history buffer 303. The history buffer 303 may store the output image frames 313 and 321 of each time point.

Based on the input processing 314, the network input data may be generated. In an example, the network input data may be stored in an input buffer 315. The first processor 301 and the second processor 302 may each have an individual memory for operations. The individual memory of the first processor 301 may be referred to as a first memory and the individual memory of the second processor 302 may be referred to as a second memory. The history buffer 303 may be a memory space of the first memory.

The input buffer 315 may be a memory space of the first memory. The network input data of the input buffer 315 may be transmitted to an input buffer 316 for the network execution 317. The input buffer 316 may be a memory space of the second memory. After the network input data is stored in the input buffer 315 of the first memory of the first processing unit 301, the network input data may be duplicated from the input buffer 315 of the first memory to the input buffer 316 of the second memory while operations of the first processor 301 are stopped. In an example, the operations of the first processor 301 may be stopped by locking the first processor 301.

The second processor 302 may execute the super-sampling neural network model based on the network input data stored in the input buffer 316 of the second memory and may generate network output data. After the network output data is stored in an output buffer 318 of the second memory, the network output data may be duplicated from the output buffer 318 of the second memory to an output buffer 319 of the first memory while operations of the first processing unit 301 are stopped. After the duplication of network output data is completed, the operations of the first processor 301 may resume.

The first processor 301 may perform output processing 320 based on the network output data. The output image frame 321 may be generated based on the output processing 314. The output image frame 321 may be stored in the history buffer 303 and may be used for input processing at a subsequent time point.

In an example, the super-sampling may be implemented through various system architectures. Based on the above description, the first processor 301 and the second processor 302 may use individual memories respectively referred to as the first memory and the second memory. In an example, the first memory and the second memory may be physically separate memories. The input buffer 315, the output buffer 319, and the history buffer 303 may be provided in the first memory of the first processor 301 and the input buffer 316 and the output buffer 318 may be provided in the second memory.

In an example, the first processor 301 and the second processor 302 may use a common memory. The common memory may be physically one memory (i.e., the same memory unit). In this case, the input buffer 315, the output buffer 319, and the history buffer 303 may be provided in a first partial space for the first processor 301 in the common memory and the input buffer 316 and the output buffer 318 may be provided in a second partial space for the second processor 302 in the common memory. The first partial space and the second partial space may be internally considered as separate memories in the system.

In an example, the second processor 302 may directly access the first memory of the first processor 301. In this case, the input buffer 315, the output buffer 319, and the history buffer 303 may be provided in the first memory of the first processor 301 and the second processor 302 may perform network execution 317 by directly accessing the input buffer 315 and may directly store the network output data upon network execution 317 in the output buffer 319. In this process, the input buffer 316 and the output buffer 318 may not be used.

In an example, in which individual memories referred to as the first memory and the second memory are used may be representatively described below. However, the description does not limit application of other embodiments.

Figure 4:
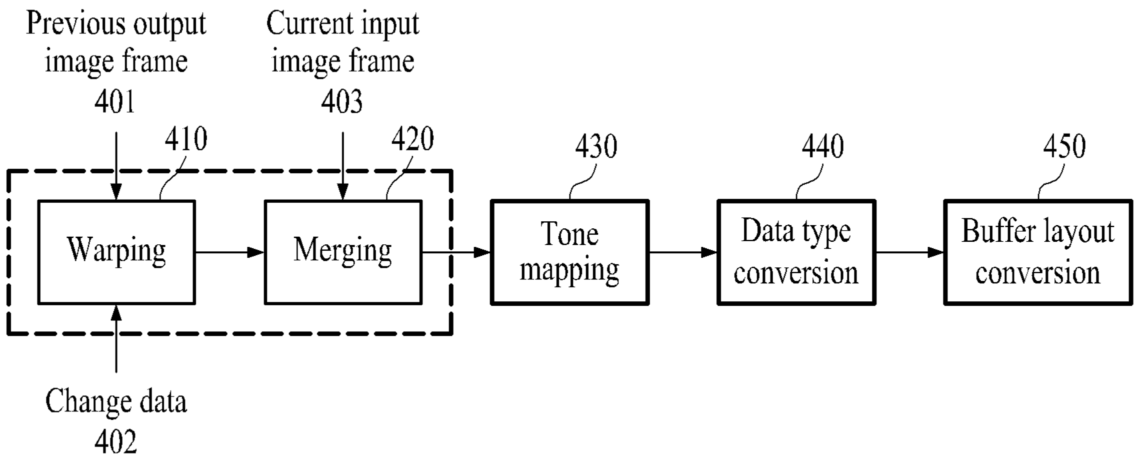
FIG. 4 illustrates an example method with super-sampling according to one or more embodiments.

FIG. 4 illustrates an example method of super-sampling, according to one or more embodiments. Referring to FIG. 4, in a non-limiting example, input processing may include warping 410, merging 420, tone mapping 430, data type conversion 440, and buffer layout conversion 450.

In an example, the warping 410 and merging 420 may be performed separately. The warping 410 of a previous output image frame 401 may be performed based on change data 402 corresponding to a change between a previous input image frame and a current input image frame 403. Based on the warping 410, a warped image may be generated. A previous time point may be the t−1-th time point and a current time point may be the t-th time point. The merging 420 of the warped image and the current input image frame 403 may be performed by mixing pixels of the warped image and pixels of the current input image frame 403. Based on the merging 420, a merged image may be generated.

In an example, the warping 410 and merging 420 may be combined. The change data 402 corresponding to a change between the previous input image frame and the current input image frame 403 may be determined and the merged image may be determined by mixing pixels of the previous output image frame 401 and pixels of the current input image frame 403 based on the change data 402. In an example, the merged image may be determined by applying a corresponding pixel of the current input image frame 403 to a position satisfying a replacement condition among pixel positions of the merged image and then warping and applying a corresponding pixel of the previous output image frame 401 to a position violating the replacement condition using the change data 402. When the warping 410 and merging 420 are combined and performed, a number of operations that may be required to determine a merged image may be minimized.

In an example, a first temporary image having a narrower dynamic range than the merged image may be generated through tone mapping 430 related to the merged image. In an example, an image (e.g., the merged image) before tone mapping 430 may use a 16-bit or a 32-bit high dynamic range (HDR) and an image (e.g., the first temporary image) after the tone mapping 430 may use an 8-bit standard dynamic range (SDR). In an example, as described in Equation 1 shown below, instead of defining a single tone mapping function for the entire range, a tone mapping function may be defined to a partial range.

$$\text{Partial Tonemap}(I) = \begin{cases} \text{Tonemap}(I), & \text{if } I \in (\text{custom range}) \\ const, & \text{otherwise} \end{cases} \quad \text{Equation 1}$$

In Equation 1, the PartialTonemap(I) may denote a function performing partial tone mapping on I, and I may denote an input image. In addition, Tonemap(I) may denote a function performing tone mapping on I, and const may denote a constant. In an example, when a custom range is set to [0, 1], Tonemap(I) may be applied to only pixel values in the custom range and pixel values outside the custom range may be converted into constants. In an example, a pixel value exceeding 1 may be fixed to 1.

In an example, pixel values of an image before tone mapping 430 may be distributed between [0, 1] but pixel values for very bright areas may have values greater than 1. However, because an effect of super-sampling on the very bright area is not significant, information loss upon an application of partial tone mapping may be significantly small. On the other hand, a limited bit-width may be efficiently used through partial tone mapping. In addition, because quantization of decreased bit-precision is applied to only a partial range through the partial tone mapping during the data type conversion 440, information loss due to quantization may be minimized. In addition, when a residual image, which is described in greater detail below, is used, super-sampling may be effectively applied to values between [0, 1] and values greater than or equal to 1 may maintain their original values.

In an example, a second temporary image having a bit-precision that is lower than the first temporary image may be generated through data type conversion 440 on the first temporary image. The data type conversion 440 may be quantization. In an example, a pixel value of an image (e.g., the first temporary image) before the data type conversion 440 may be expressed as a real data type and an image (e.g., the second temporary image) after the data type conversion 440 may be expressed as an integer data type. In an example, based on the tone mapping 430 and the data type conversion 440, 16-bit or 32-bit real number representation may be converted into 8-bit integer representation. In an example, based on data type conversion 440, a quantized data type may include uint8, int8, a custom quantized format, and the like. However, the quantized data type is not limited thereto and various bits less than 8 bits, such as 6 bits and 4 bits, may be used as the quantized data type.

Network input data may be determined based on buffer layout conversion 450 on the second temporary image. The network input data may have a depth characteristic layout of the second temporary image instead of a spatial characteristic layout through buffer layout conversion 450 on the second temporary image. The buffer layout conversion 450 may correspond to space-to-depth conversion. However, the type of the buffer layout conversion 450 is not limited thereto and according to one embodiment, the buffer layout conversion 450 may be omitted or a different type of conversion from space-to-depth conversion may be performed.

Figure 5:
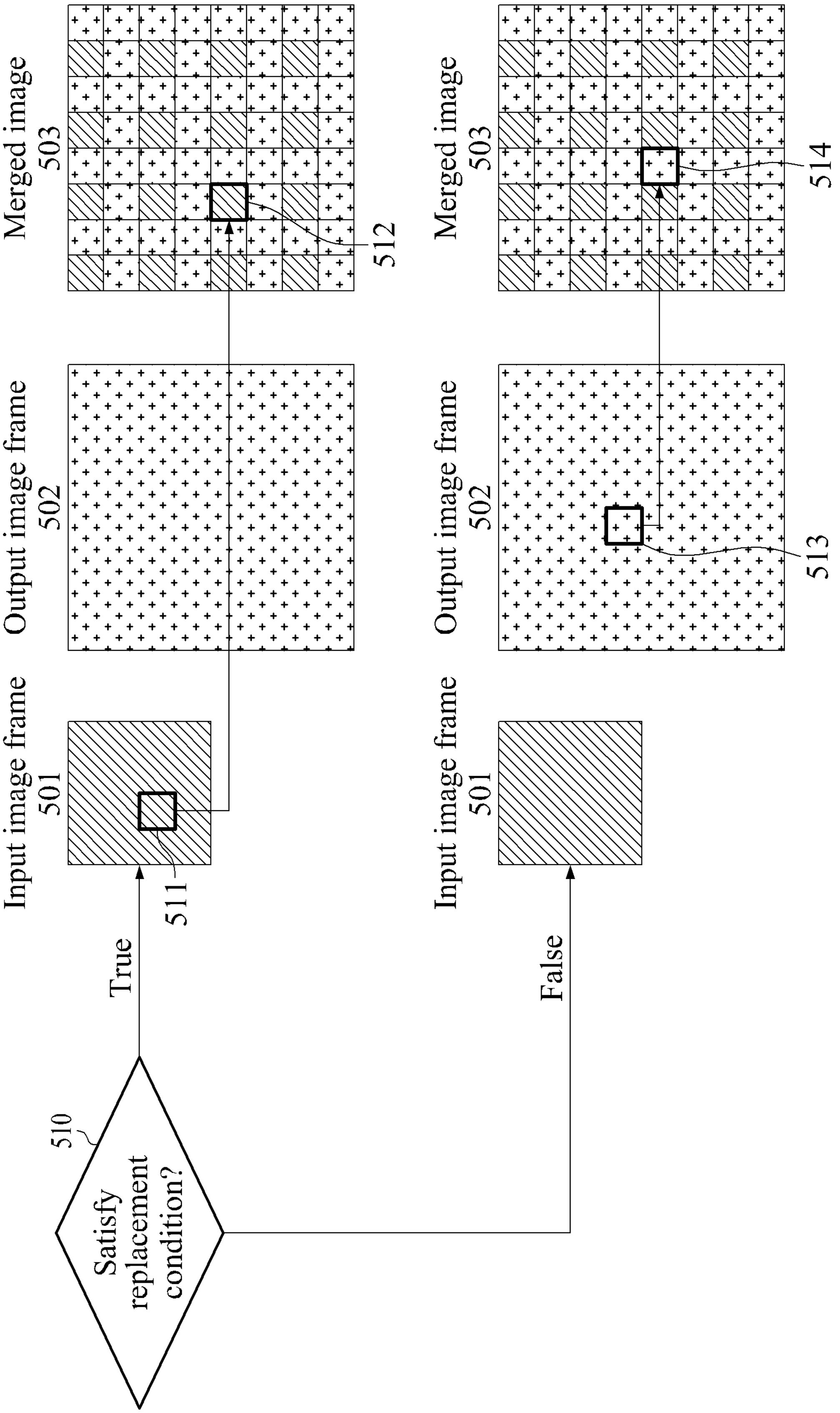
FIG. 5 illustrates an example method with an image merging operation based on a pixel position according to one or more embodiments.

FIG. 5 illustrates an example method of image merging based on a pixel position, according to one or more embodiments. In a non-limiting example, the image merging operation of FIG. 5 may be performed through a combination of a warping operation with a merging operation. Referring to FIG. 5, a merged image 503 may be generated by merging an input image frame 501 at a t-th time point and an output image frame 502 at a t−1-th time point. After a pixel of the output image frame 502 is warped based on change data, the pixel may be applied to the merged image 503.

In a non-limiting example, a replacement condition 510 based on a pixel position of the merged image 503 may be defined, and pixels of the merged image 503 may be determined by mixing pixels of the input image frame 501 with pixels of the output image frame 502 based on whether the replacement condition 510 is satisfied.

In an example, pixel positions of the merged image 503, a position satisfying the replacement condition 510 may be classified as a replacement position and a position violating the replacement condition may be classified as a maintenance position. A corresponding pixel of the input image frame 501 may be applied to the replacement position. A corresponding pixel of the output image frame 502 that is warped using the change data may be applied to the maintenance position.

In a non-limiting example, the replacement condition 510 may be based on a grid that is defined based on a size difference between the input image frame 501 and the output image frame 502 and an arbitrary cell position in the grid. When a width of the output image frame 502 is a times the width of the input image frame 501 and a height of the output image frame 502 is b times the width of the input image frame 501, an a*b grid may be defined. An arbitrary cell position in the a*b grid may be selected. A corresponding cell position in the merged image 503 may satisfy the replacement condition 510. For example, when a width of the input image frame 501 is twice the width of the output image frame 502 and a height of the input image frame 501 is twice the height of the output image frame 502, a 2*2 grid may be defined. Among cells of (1, 1), (1, 2), (2, 1) and (2, 2) of the grid, the cell position (1, 1) may be selected. A fixed cell position may be applied to all pixel positions satisfying the replacement condition or a different cell position may be applied to each pixel position. A pixel position corresponding to the cell position in the merged image 503 may satisfy the replacement condition 510. FIG. 5 may represent an example in which the cell position (1, 1) in the 2*2 grid is selected to define the replacement condition 510.

In a non-limiting example, the image merging operation may be performed based on pseudocode of Table 1.

TABLE 1

```
uint2 InputPixelPos = sampleInputPixelPos (OutputPixelPos,
UpscaleFactor);
uint2 motion = getMotion (MotionVector, OutputPixelPos);
if ( isInputTextureLocation ( OutputPixelPos ) == True )
    MergedTexture[OutputPixelPos] = InputTexture[InputPixelPos];
else
    MergedTexture[OutputPixelPos] =
OutputTexture[OutputPixelPos+motion];
```

In Table 1, OutputPixelPos may be a position (e.g., an x coordinate and a y coordinate) of a pixel that is desired to obtain a value in the merged image 503, UpscaleFactor may be the size (or resolution) difference (or a ratio) between the input image frame 501 and the output image frame 502, sampleInputPixelPos( ) may be a function that sets a position of the input image frame 501 to be sampled with respect to OutputPixelPos, getMotion( ) may be a function that retrieves a value of difference data (e.g., a motion vector) on OutputPixelPos, and isInputTextureLocation( ) may be a function that determines whether coordinates of the merged image 503 satisfy the replacement condition 50. In association with getMotion( ) additional processing, such as bilinear sampling, may be performed.

According to the code of Table 1, when OutputPixelPos satisfies a condition by isInputTextureLocation, a pixel value of the input image frame 501 may be substituted into the position and when OutputPixelPos does not satisfy the condition, a pixel value of the output image frame 502 may be warped and then may be substituted. The isInputTextureLocation( ) function may determine a position of the merged image 503 to be substituted by information of the input image frame 501. As illustrated in FIG. 5, in an example, when the output image frame 502 corresponds to twice upscaling of the input image frame 501, information of the input image frame 501 may be substituted into the (1, 1) position of the 2*2 grid. In an example, a pixel position 512 based on OutputPixelPos may satisfy the replacement condition 510 and a pixel value of a pixel position 511 based on InputPixelPos may be applied to the pixel position 512. In an example, a pixel position 514 according to OutputPixelPos may violate the replacement condition 510 and a pixel value of a pixel position 513 according to OutputPixelPos+motion may be applied to the pixel position 514.

The isInputTextureLocation function may vary depending on an algorithm and in this process, camera jitter may also be considered. In an example, for the input image frame 501 and the output image frame 502, a merging method, such as concatenation in a channel dimension direction as well as a method of merging in a high-resolution image, such as the merged image 503, may be used.

Figure 6:
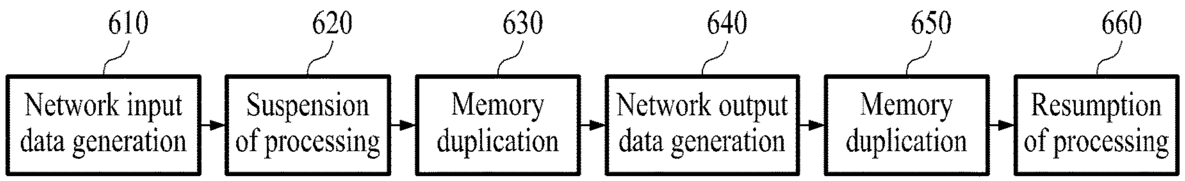
FIG. 6 illustrates an example method with a network execution of super-sampling according to one or more embodiments.

FIG. 6 illustrates an example method of super-sampling, according to one or more embodiments. Referring to FIG. 6, in a non-limiting example, when network input data generation 610 is performed by a first processor, suspension of processing 620 of the first processor may be performed and through memory duplication 630, network input data stored in a first memory space of the first processor may be duplicated to a second memory space of a second processor. In an example, the first memory space may be a separate memory (e.g., the first memory) for the first processor or a partial space (e.g., a first partial space) in a common memory that is shared by the first processor and the second processor. In an example, the second memory space may be a separate memory (e.g., the second memory) for the second processor or a partial space (e.g., a second partial space) in the common memory that is shared by the first processor and the second processor. When network output data generation 640 is performed by the second processor, through memory duplication 650, network output data stored in the second memory space may be duplicated to the first memory space. After the duplication is completed, resumption of processing 660 of the first processor may be performed. In an example, memory duplication 630 and/or memory duplication 650 may be omitted in a system architecture in which the second processor is able to directly access the first memory.

A neural network model may be executed for the network output data generation 640. Execution of the neural network model may include an inference operation of the neural network model. In an example, the inference operation may be performed through available various execution libraries, such as tflite, onnx runtime, and Snapdragon neural processing engine (SNPE).

The network output data may be an image with enhanced image quality or a residual image to be added to an input image frame to obtain an image with enhanced image quality. The neural network model may be trained to output an image with enhanced image quality or a residual image. When the residual image is used, the neural network model may omit upsampling or an addition operation, and thus, this may be advantageous for weight lightening.

Figure 7A:
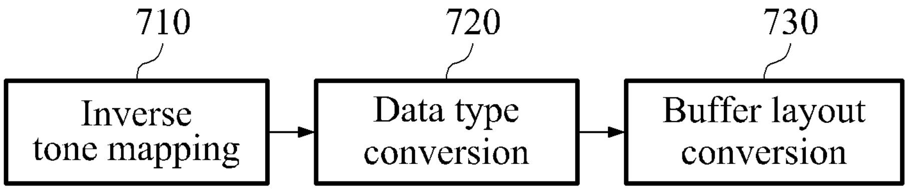
FIGS. 7A and 7B illustrate an example method with output processing of super-sampling according to one or more embodiments.
Figure 7B:
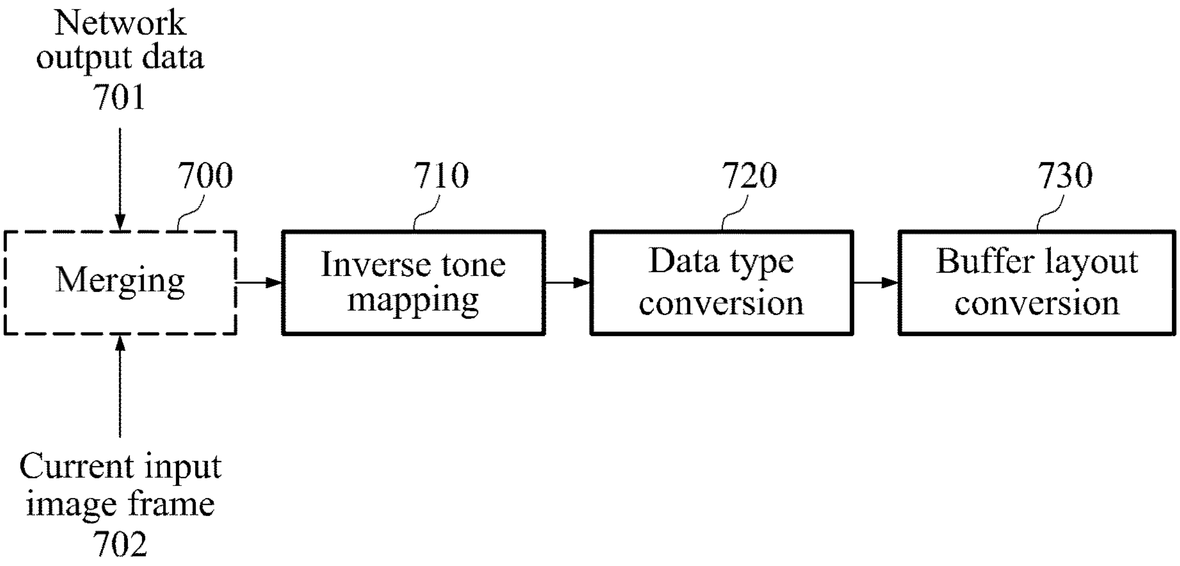

FIGS. 7A and 7B illustrate example methods of super-sampling, according to one or more embodiments. Referring to FIG. 7A, in a non-limiting example, output processing may include inverse tone mapping 710, data type conversion 720, and buffer layout conversion 730.

In an example, the inverse tone mapping 710 may correspond to an inverse operation of tone mapping of input processing. A third temporary image having a wider dynamic range than network output data may be generated through the inverse tone mapping 710 on the network output data. In an example, an image (e.g., the network output data) before the inverse tone mapping 710 may use 8-bit SDR and an image (e.g., the third temporary image) after the inverse tone mapping 710 may use 16-bit or 32-bit HDR.

In an example, the data type conversion 720 may be an inverse operation of the data type conversion of the input processing. A fourth temporary image having a bit-precision that is higher than the third temporary image may be generated through data type conversion 720 on the third temporary image. In an example, a pixel value of an image (e.g., the third temporary image) before data type conversion 720 may be expressed as an integer data type and an image (e.g., the fourth temporary image) after the data type conversion 720 may be expressed as a real data type. In an example, based on inverse tone mapping 710 and data type conversion 720, 8-bit integer representation may be converted into 16-bit or 32-bit real number representation.

In an example, the buffer layout conversion 730 may be an inverse operation of buffer layout conversion of input processing. An output image frame may be determined based on the buffer layout conversion 730. The output image frame may have a spatial characteristic layout of the fourth temporary image instead of a depth characteristic layout through the buffer layout conversion 730 on the fourth temporary image. In an example, the layout conversion 730 may correspond to depth-to-space conversion.

Referring to FIG. 7B, in a non-limiting example, the output processing may further include merging 700. As described above, the network output data 701 may be an image with an enhanced image quality or a residual image to be added to an input image frame to obtain an image with enhanced image quality. When the network output data 701 corresponds to a residual image, the output processing may also include the merging 700. Through the merging 700, the network output data 701 corresponding to the residual image may be merged to a current input image frame 702.

In a non-limiting example, Table 2 shown below may represent an example of pseudocode used to determine an output image frame when the network output data 701 is an image with enhanced image quality.

TABLE 2

```
OutputTexture[OutputPixelPos] = InverseTonemap [convertToFloat
(Output Buffer[BufferIndex])]
```

In a non-limiting example, Table 3 shown below may represent an example of pseudocode used to determine an output image frame when the network output data 701 is a residual image to be added to an input image frame to obtain an image with enhanced image quality.

TABLE 3

```
    uint2 InputPixelPos = sampleInputPixelPos (OutputPixelPos,
  UpscaleFactor);
    OutputTexture[OutputPixelPos] =
      InverseTonemap [Tonemap(InputTexture[InputPixelPos])
      + convertToFloat (Output Buffer[BufferIndex])]
```

In an example, OutputPixelPos may be a position (e.g., an x coordinate and a y coordinate) of a pixel that is desired to obtain a value in an output image frame, UpscaleFactor may be the size (or resolution) difference (or a ratio) between an input image frame and an output image frame, sampleInputPixelPos( ) may be a function for setting a position of an input image frame to be sampled with respect to OutputPixelPos, and convertToFloat( ) may be a function for converting quantized data into real data.

In an example, Tonemap( ) and InverseTonemap( ) may mutually be an inverse conversion relationship. Buffer layout conversion, such as space-to-depth conversion or depth-to-space conversion, may be performed together by appropriately adjusting BufferIndex.

Figure 8:
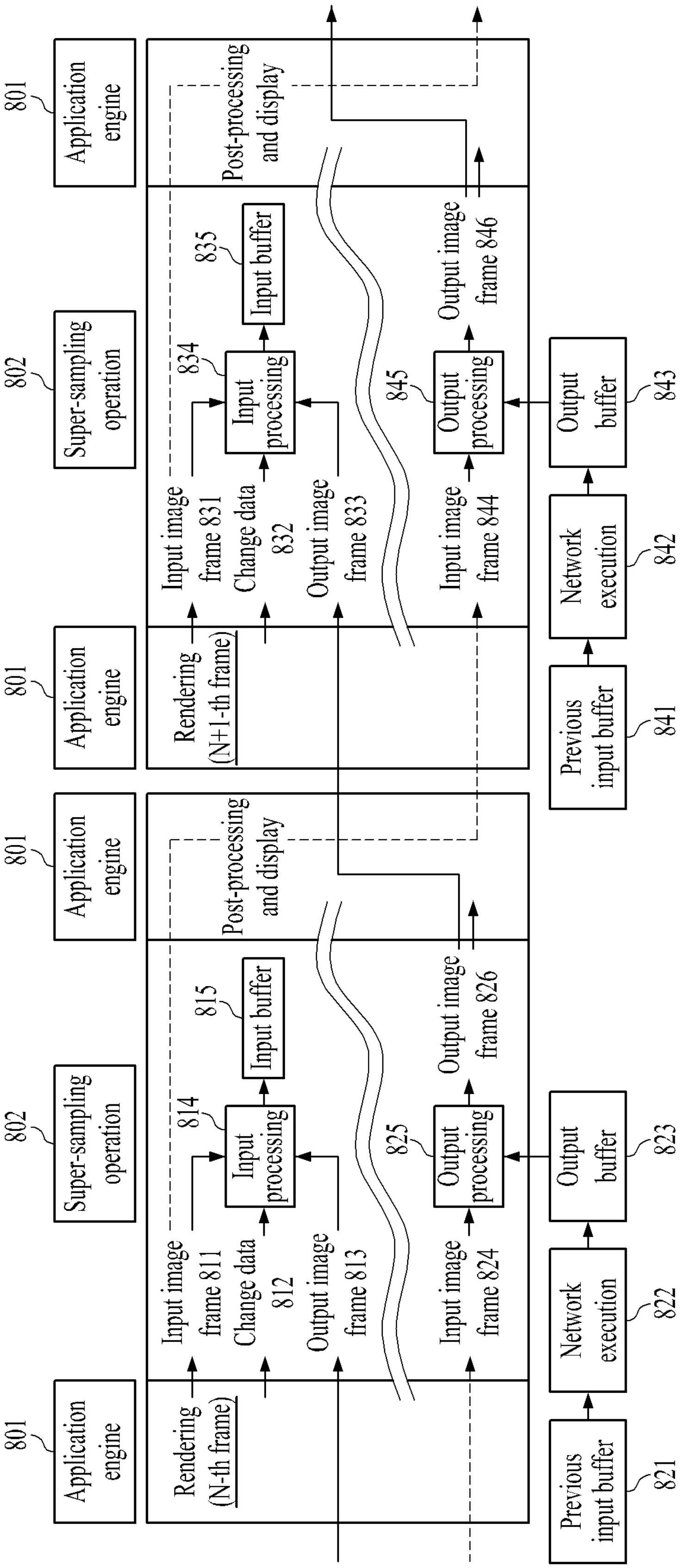
FIG. 8 illustrates an example of an asynchronous pipeline of super-sampling according to one or more embodiments.

FIG. 8 illustrates an example method of super-sampling according to one or more embodiments. Referring to FIG. 8, in a non-limiting example, super-sampling 802 may be performed based on an N-th frame rendered at a t-th time point and the super-sampling 802 may then be performed based on an N+1-th frame rendered at a t+1-th time point. At the t-th time point, input processing 814 of an input image frame 811 corresponding to a rendering result of the N-th frame may be performed and network input data based on the input processing 814 may be stored in an input buffer 815. An output image frame 826 of an N−1-th frame of a previous input buffer 821 may be displayed at the t-th time point rather than at an output image frame 846 of the N-th frame based on the input image frame 811 of the N-th frame. The output image frame 846 of the N-th frame may be displayed at the t+1-th time point.

In an example, a pipeline having latency between a rendered frame (e.g., the N-th frame) and a display frame (e.g., the N−1-th frame) may be referred to as an asynchronous pipeline. According to a sequential pipeline method that displays the output image frame 846 of the N-th frame at the t-th time point and displays an output image frame (not shown) of the N+1-th frame at the t+1-th time point, a latency may occur in response to suspension or resumption of a processor (e.g., the first processor). According to the asynchronous pipeline method, the latency that may occur in response to suspension or resumption of the processor (e.g., the first processor) may be removed.

As higher frame per second (FPS) speeds are used, although a difference of 1 frame between a rendered frame and a display frame occurs according to the asynchronous pipeline method, the resulting difference may occur in a short enough of a period of time where a user may not substantially be able to sense the difference.

More specifically, an application engine 801 may render the N-th frame at the t-th time point. The input image frame 811 may correspond to the N-th frame. At the t-th time point, the input processing 814 may be performed based on the input image frame 811, change data 812, and an output image frame 813. Network input data based on input processing 814 may be stored in the input buffer 815. The input buffer 815 may correspond to a first memory space (e.g., the first memory or the first partial space) of the first processor. In an example, to execute a neural network model based on the network input data of the input buffer 815, the first processor may be locked for buffer transmission. This locking and/or unlocking may cause an increased amount of latency. Accordingly, the neural network model may be executed based on the network input data based on the N−1-th frame instead of the N-th frame at the t-th time point.

In an example, network execution 822 may be performed based on the network input data of the previous input buffer 821 at the t-th time point. The network input data of the previous input buffer 821 may be based on the N−1-th frame rendered at the t−1-th time point. The previous input buffer 821 may correspond to a second memory space (e.g., the second memory or the second partial space) of the second processor. Network output data based on the network execution 822 may be stored in an output buffer 823 of the second memory space. The network output data of the output buffer 823 may be transmitted to the first memory space and output processing 825 may be performed based on the network output data of the first memory space. When the network output data corresponds to a residual image, an input image frame 824 may be used for output processing 825. The output image frame 826 may be generated based on the output processing 825.

In an example, the application engine 801 may perform post-processing and a display operation based on the output image frame 826 at the t-th time point. The output image frame 826 may correspond to a high-resolution version of the N−1-th frame. Network input data of the N−1-th frame between the t−1-th time point and the t-th time point may be transmitted to the previous input buffer 821 of the second memory space from an input buffer (not shown) of the first memory space, a network execution 822 may be performed, the network output data may be transmitted to an output buffer (not shown) of the first memory space from the output buffer 823 of the second memory space, and the output image frame 826 may be generated. Accordingly, the output image frame 826 of the N−1-th frame rendered at the t−1-th time point may be displayed instead of the output image frame 846 of the N-th frame rendered at the t-th time point. The output image frame 846 may be displayed at the t+1-th time point.

More specifically, the application engine 801 may render the N+1-th frame at the t+1-th time point. The input image frame 831 may correspond to the N+1-th frame. Input processing 834 may be performed based on the input image frame 831, change data 832, and an output image frame 833 at the t+1-th time point. Network input data based on the input processing 834 may be stored in an input buffer 835. The input buffer 835 may correspond to the first memory space of the first processor.

In an example, the network execution 842 may be performed based on network input data of a previous input buffer 841 at the t+1-th time point. The network input data of the previous input buffer 841 may be based on the N-th frame rendered at the t-th time point. The previous input buffer 841 may correspond to the memory space of the second memory space of the second processor. Network output data based on the network execution 842 may be stored in an output buffer 843. The network output data of the output buffer 843 may be transmitted to the first memory space, and output processing 845 may be performed based on the network output data of the first memory space. When the network output data corresponds to a residual image, an input image frame 844 may be used for output processing 845. The output image frame 846 may be generated based on output processing 845.

In a non-limiting example, the application engine 801 may perform post-processing and a display operation based on the output image frame 846 at the t+1-th time point. The output image frame 846 may correspond to a high-resolution version of the N-th frame. The output image frame 846 of the N-th frame rendered at the t-th time point may be displayed instead of the output image frame (not shown) of the N+1-th frame rendered at the t+1-th time point. The output image frame (not shown) of the N+1-th frame may be displayed at the t+2-th time point.

Figure 9A:
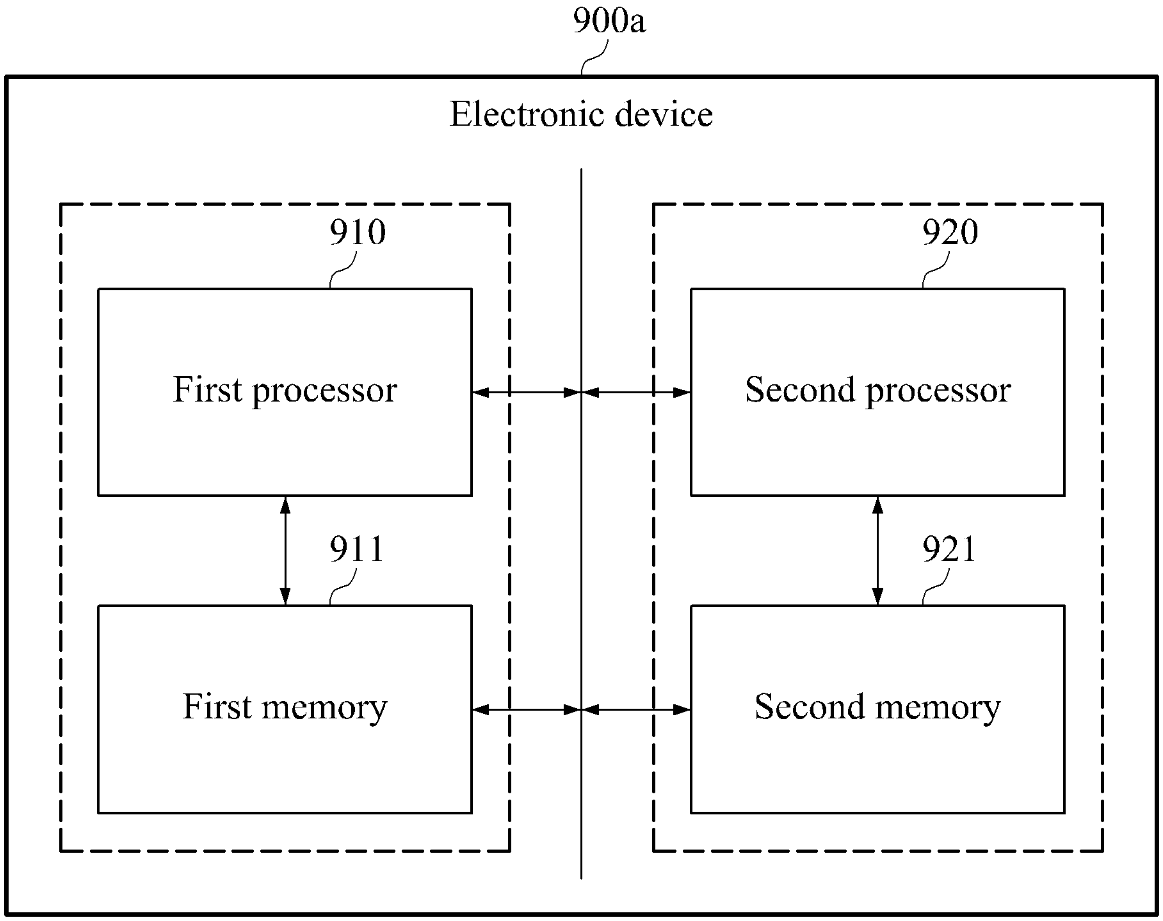
FIGS. 9A to 10 illustrate example electronic devices according to one or more embodiments.
Figure 9B:
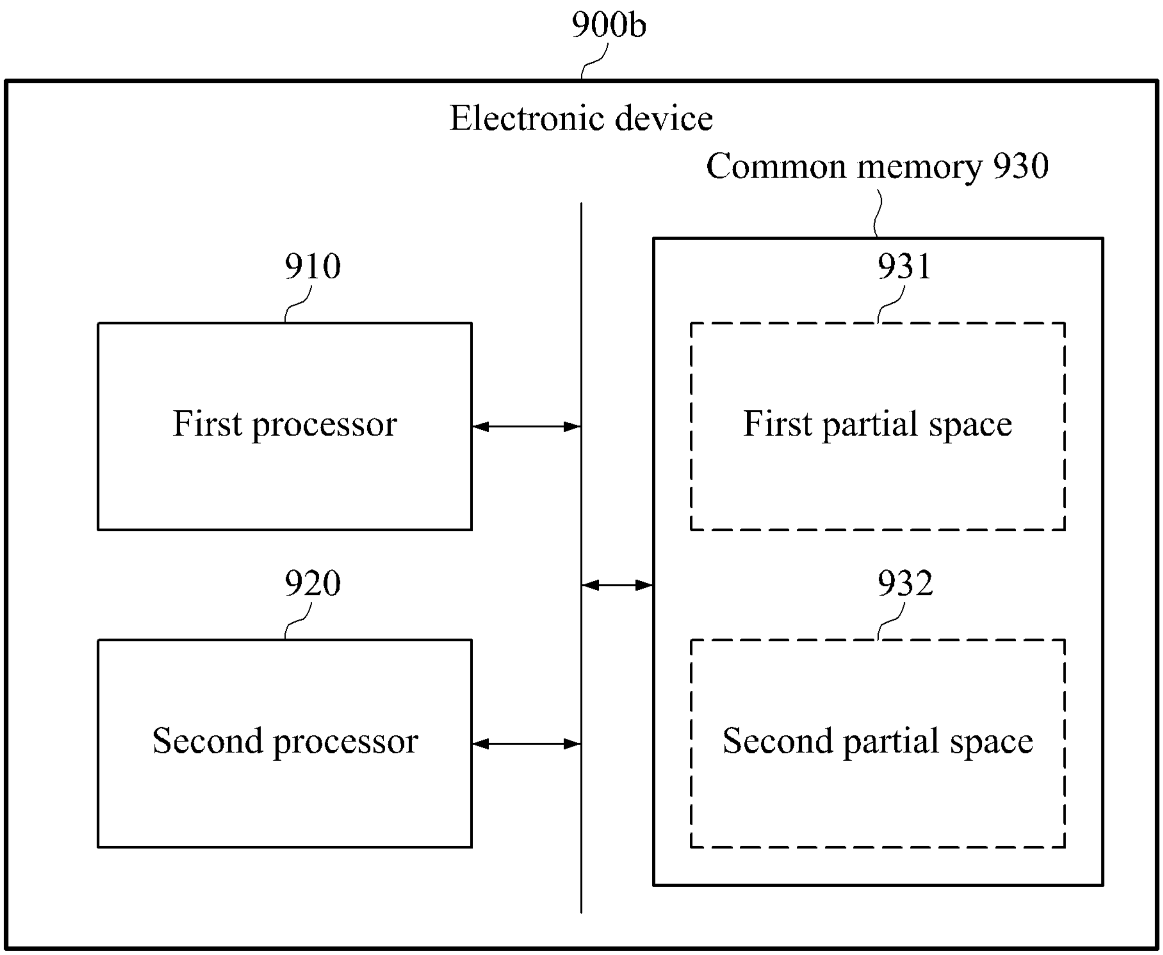
Figure 9C:
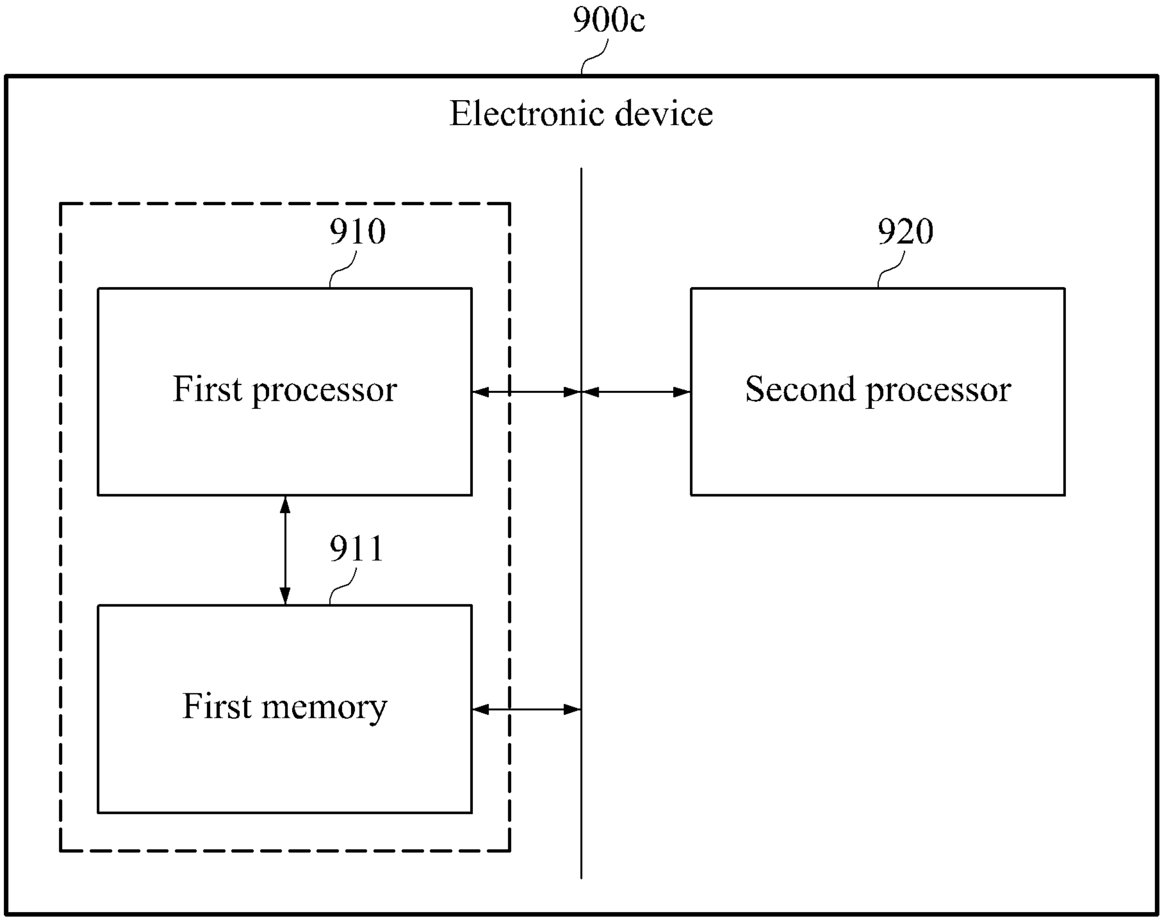
Figure 10:
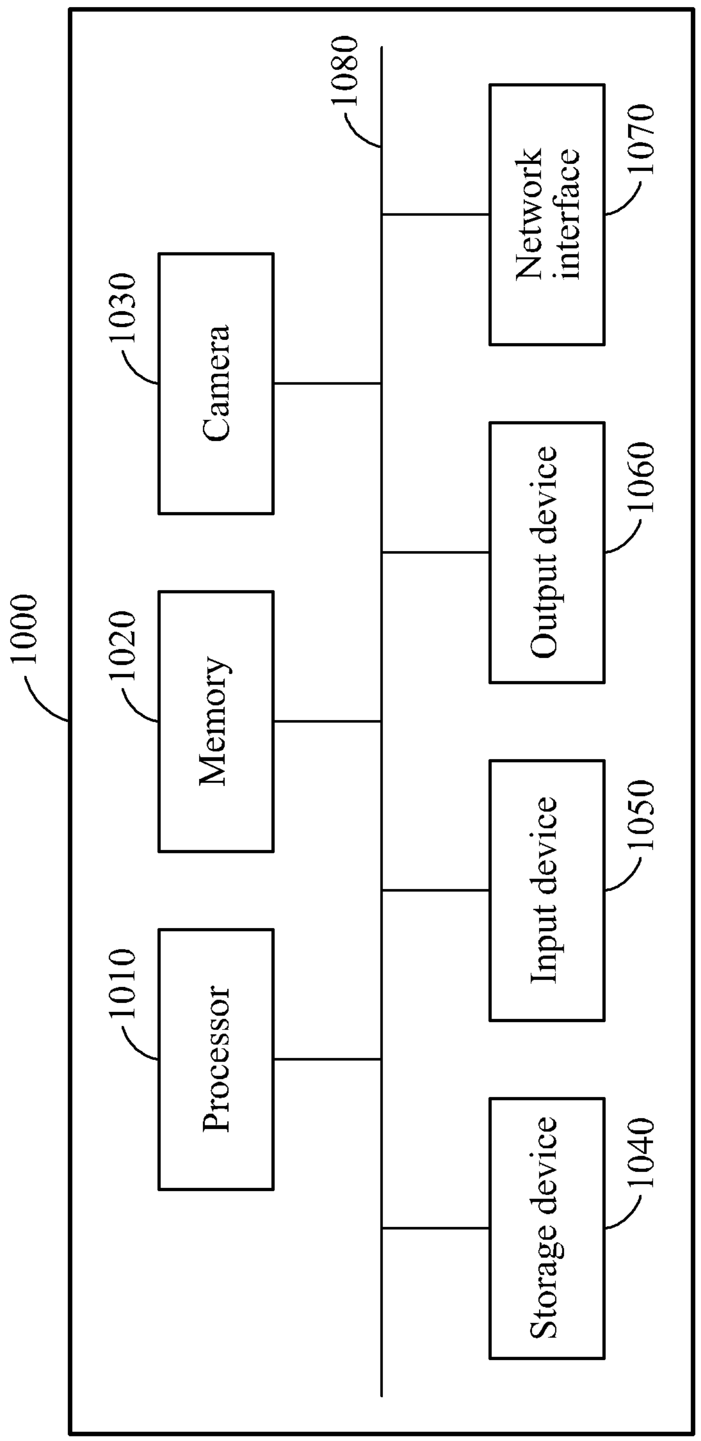

FIGS. 9A to 10 illustrate an example electronic devices according to one or more embodiments. Referring to FIG. 9A, in a non-limiting example, an electronic device **900*a* may include a first processor 910, a first memory 911, a second processor 920, and a second memory 921. The first memory 911 and the second memory 921 may include computer-readable instructions. The first processor 910 and the second processor 920 may be configured to execute computer-readable instructions, such as those stored in the first memory 911 and/or the second memory 921, and through execution of the computer-readable instructions, the first processor 910 and the second processor 920 are configured to perform one or more, or any combination, of the operations and/or methods described herein, as well as implementation of the trained neural network. The first memory 911 and/or the second memory 921 may represent one or more memories. The first memory 911 and/or the second memory 921 may be a volatile or nonvolatile memory. The first memory 911 and the second memory 921 may store data computed by the first processor 910 and the second processor 920, or data processed by the first processor 910 and the second processor 920. Each of the first processor 910 and second processor 920** may represent one or multiple processors.

In an example, the electronic device **900*a* may include the first processor 910 configured to generate a merged image by merging a first output image frame corresponding to a super-sampling result at a first time point with a second input image frame corresponding to a super-sampling target at a second time point and determine network input data by decreasing bit-precision of the merged image and the second processor 920 configured to generate network output data by executing a neural network model based on the network input data. The first processor 910** may generate a second output image frame corresponding to a super-sampling result at the second time point by increasing bit-precision of the network output data.

In an example, to generate the merged image, the first processor 910 may determine change data corresponding to a change between the second input image frame and the first input image frame corresponding to a super-sampling target at the first time point and may generate the merged image by mixing pixels of the first output image frame and pixels of the second input image frame based on the change data.

In an example, to determine the merged image, the first processor 910 may apply a corresponding pixel of the second input image frame to a position satisfying a replacement condition among pixel positions of the merged image and may warp a corresponding pixel of the first output image frame using the change data and apply the warped corresponding pixel to a position violating the replacement condition among the pixel positions of the merged image.

In an example, to determine the network input data, the first processor 910 may generate a first temporary image having a narrower dynamic range than the merged image by performing tone mapping on the merged image and may generate a second temporary image having lower bit-precision than the first temporary image by performing data type conversion on the first temporary image.

In an example, after the network input data is stored in the first memory 911 of the first processor 910, while operations of the first processor 910 are stopped, the network input data may be duplicated from the first memory 911 to the second memory 921 of the second processor 920. After the network output data is stored in the second memory 921, while operations of the first processor 910 are stopped, the network output data may be duplicated from the second memory 921 to the first memory 911 and after duplication of the network output data is completed, operations of the first processor 910 may resume.

In an example, the second input image frame may correspond to a result of rendering at a second time point and based on the asynchronous pipeline method, the first output image frame may be displayed at the second time point instead of the second output image frame and the second output image frame may be displayed at the third time point.

The first processor 910 and the second processor 920 may be configured to execute computer-readable instructions that configure the first processor 910 and/or the second processor 920 to control the electronic apparatus 100 to perform one or more or all operations and/or methods involving the super-sampling of images, and may include any one or a combination of two or more of, for example, a central processing unit (CPU), a graphic processing unit (GPU), a neural processing unit (NPU), and/or tensor processing units (TPUs), but is not limited to the above-described examples.

Referring to FIG. 9B, in a non-limiting example, an electronic device 900*b* may include a common memory 930 instead of the first memory 911 and the second memory 921 of FIG. 9A. The common memory 930 may include a first partial space 931 for the first processor 910 and a second partial space 932 for the second processor 920. The common memory 930 may correspond to physically a single memory, and the first partial space 931 and the second partial space 932 may be internally treated as separate memories in the system.

Referring to FIG. 9C, in an electronic device 900*c*, the second processor 920 may directly access the first memory 911. In this case, a separate memory for the second processor 920, such as the second memory 921 of FIG. 9A, and/or a memory shared by the first processor 910 and the second processor 920, such as the common memory 930 of FIG. 9B, may exist or may not exist. The second processor 920 may directly access the first memory 911 and may execute a neural network model.

In addition, descriptions provided with reference to FIGS. 1 to 8, FIG. 10, and FIG. 11 may be applicable to the electronic device 900*a*, 900*b*, or 900*c*.

Referring to FIG. 10, in a non-limiting example, an electronic device 1000 may include a processor 1010, a memory 1020, a camera 1030, a storage device 1040, an input device 1050, an output device 1060, and a network interface 1070 that may communicate with each other through a communication bus 1080. In an example, the electronic device 1000 may be implemented as at least a part of a mobile device such as a mobile phone, a smartphone, a personal digital assistant (PDA), a netbook, a tablet personal computer (PC) or a laptop computer, a wearable device such as a smart watch, a smart band or smart glasses, a computing device such as a desktop or a server, a home appliance such as a television (TV), a smart TV or a refrigerator, a security device such as a door lock, or a vehicle such as an autonomous vehicle or a smart vehicle. The electronic device 1000 may include, structurally and/or functionally, the electronic device 900*a*, 900*b*, or 900*c* of FIGS. 9A to 9C.

The processor 1010 may be configured to computer-readable instructions that configure the processor 1010 to control the electronic apparatus 1000 to perform one or more or all operations and/or methods involving the super-sampling of images. For example, the processor 1010 may process instructions stored in the memory 1020 or the storage device 1040. The processor 1010 may perform operations of FIGS. 1 to 9 and FIG. 11. The memory 1020 may include computer-readable instructions. The computer-readable instructions, such as those stored in the memory 1020 and/or the storage device 1040, and through execution of the computer-readable instructions, are executed by the processor 1010 to configure the processor 1010 to perform one or more, or any combination, of the operations and/or methods described herein. The memory 1020 may be a volatile or nonvolatile memory.

The camera 1030 may capture a photo and/or record a video. The storage device 1040 may include a computer-readable storage medium or computer-readable storage device. The storage device 1040 may store more information than the memory 1020 for a long time. For example, the storage device 1040 may include a magnetic hard disk, an optical disc, a flash memory, a floppy disk, or other non-volatile memories known in the art.

The input device 1050 may receive an input from the user in traditional input manners through a keyboard and a mouse and in new input manners such as a touch input, a voice input, and an image input. For example, the input device 1050 may include a keyboard, a mouse, a touch screen, a microphone, or any other device that detects the input from the user and transmits the detected input to the electronic device 1000. The output device 1060 may provide an output of the electronic device 1000 to the user through a visual, auditory, or haptic channel. The output device 1060 may include, for example, a display, a touch screen, a speaker, a vibration generator, or any other device that provides the output to the user. The network interface 1070 may communicate with an external device through a wired or wireless network.

In addition, descriptions of FIGS. 1 to 9C and FIG. 11 may be applicable to the electronic device 1000.

Figure 11:
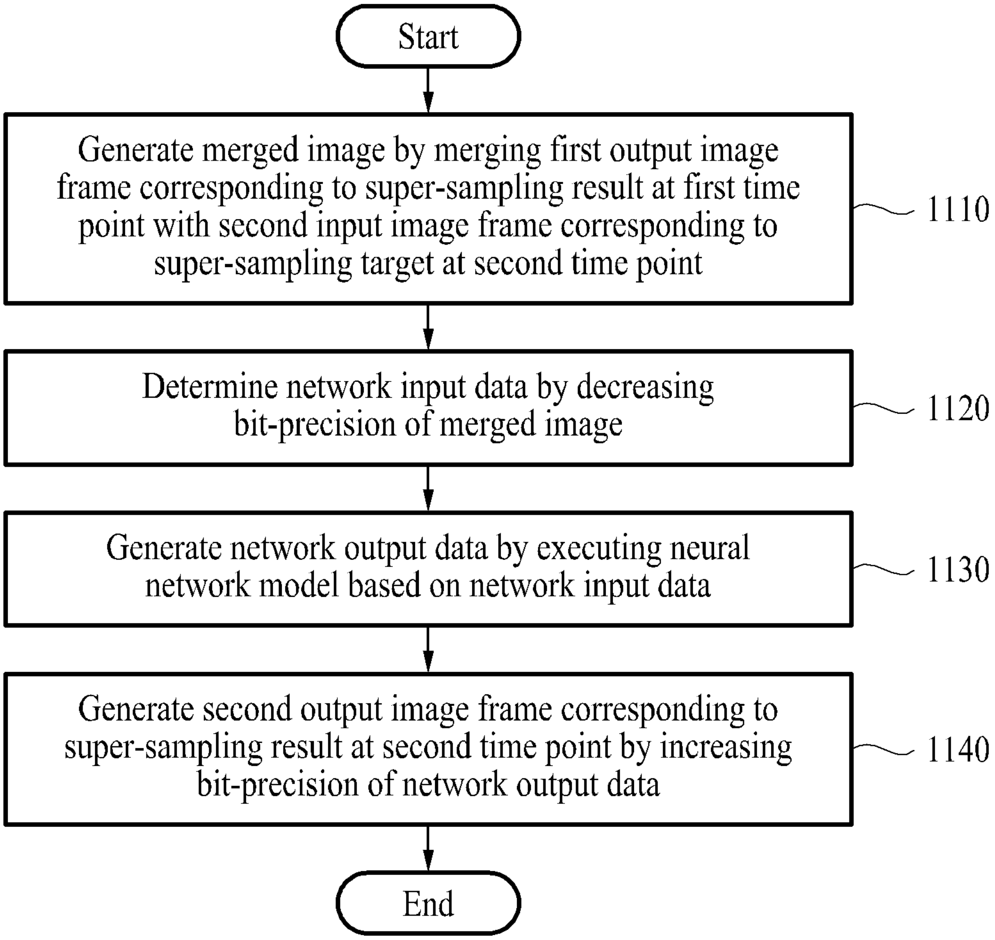
FIG. 11 illustrates an example super-sampling method according to one or more embodiments.

FIG. 11 illustrates an example of a method according to one or more embodiments. Referring to FIG. 11, in a non-limiting example, an electronic device may generate a merged image by merging a first output image frame corresponding to a super-sampling result at a first time point with a second input image frame corresponding to a super-sampling target at a second time point in operation 1110, may determine network input data by decreasing bit-precision of the merged image in operation 1120, may generate network output data by executing a neural network model based on the network input data in operation 1130, and may generate a second output image frame corresponding to a super-sampling result at the second time point by increasing bit-precision of the network output data in operation 1140.

In an example, operation 1110 may include determining change data corresponding to a change between the second input image frame and the first input image frame corresponding to a super-sampling target at the first time point and generating the merged image by mixing pixels of the first output image frame and pixels of the second input image frame based on the change data. The determining of the merged image may include applying a corresponding pixel of the second input image frame to a position satisfying a replacement condition among pixel positions of the merged image, and warping a corresponding pixel of the first output image frame using the change data, and applying the warped corresponding pixel to a position violating the replacement condition among the pixel positions of the merged image.

In an example, operation 1120 may include generating a first temporary image having a narrower dynamic range than the merged image by performing tone mapping on the merged image and generating a second temporary image having lower bit-precision than the first temporary image by performing data type conversion on the first temporary image.

In an example, operation 1120 may include performing buffer layout conversion on the second temporary image such that the network input data has a depth characteristic layout instead of a spatial characteristic layout of the second temporary image.

In an example, the merged image may be expressed as a real data type and network input data may be expressed as an integer data type.

In a non-limiting example, a first processor may be used for determining the network input data and a second processor may be used for generating the network output data. The first processor and the second processor may be different types of processors. After the network input data is stored in a first memory space of the first processor, while operations of the first processor are stopped, the network input data may be duplicated from the first memory space to a second memory space of the second processor. After the network output data is stored in the second memory space, while operations of the first processor are stopped, the network output data may be duplicated from the second memory space to the first memory space and after duplication of the network output data is completed, operations of the first processor may resume.

In an example, the second input image frame may correspond to a result of rendering at a second time point and based on the asynchronous pipeline method, the first output image frame may be displayed at the second time point instead of displaying the second output image frame and the second output image frame at the third time point.

In an example, the second output image frame may have higher quality than the second input image frame.

The processors, memories, machine learning models, neural networks, electronic apparatuses, electronic apparatus 100, super-sampling operation 120, application engine 110, application engine 201, first processor 301, second processor 302, and application engine 801 described herein and disclosed herein described with respect to FIGS. 1-11 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method of a processor, the method comprising:

generating, by a first processor, a merged image by merging a first super-sampled image frame, having been generated at a first time point, with a second input image frame corresponding to a super-sampling target for a second time point; and generating a second super-sampled image frame by performing a super-sampling operation at the second time point that includes increasing, by the first processor, a bit-precision of a result of executing, by a second processor, a super-sampling neural network model provided with a decreased bit-precision of the merged image, wherein, according to an asynchronous pipeline method, the first super-sampled image frame is displayed at the second time point instead of the first time point when the first super-sampled image frame was generated, and wherein the second super-sampled image frame is displayed at a third time point instead of the second time point.

2. The method of claim 1, wherein the merging comprises:

generating the merged image by mixing pixels of the first super-sampled image frame and pixels of the second input image frame based on determined change data; and determining the change data corresponding to a change between the second input image frame and a first input image frame corresponding to a super-sampling target at the first time point.

3. The method of claim 2, wherein the generating of the merged image comprises:

applying a corresponding pixel of the second input image frame to a position satisfying a replacement condition among pixel positions of the merged image; and warping and applying a corresponding pixel of the first super-sampled image frame to a position violating the replacement condition among the pixel positions of the merged image using the change data.

4. The method of claim 1, wherein the generating of the second super-sampled image frame comprises:

generating a first temporary image having a narrower dynamic range than the merged image by performing tone mapping on the merged image; and generating a second temporary image having lower bit-precision than the first temporary image by performing data type conversion on the first temporary image.

5. The method of claim 4, further comprising:

performing buffer layout conversion on the second temporary image to determine network input data, wherein the network input data has a depth characteristic layout instead of a spatial characteristic layout of the second temporary image.

6. The method of claim 5, wherein the merged image is expressed as a real number data type, and wherein the network input data is expressed as an integer number data type.

7. The method of claim 5, wherein the decreasing of the bit-precision is performed by the first processor, and wherein the first processor is one among a first plurality of processors and the second processor is one among a different plurality of second processors.

8. The method of claim 7, further comprising:

storing the network input data in a first memory space of the first processor; and duplicating the network input data from the first memory space to a second memory space of the second processor while an operation of the first processor is stopped.

9. The method of claim 8, further comprising:

storing network output data in the second memory space; and duplicating the network output data from the second memory space to the first memory space while the operation of the first processor is stopped, and wherein, in response to the duplication of the network output data being completed, the operation of the first processor is resumed.

10. The method of claim 1, wherein the second super-sampled image frame has higher quality than the second input image frame.

11. An electronic device, comprising:

a first processor configured to:

merge a first super-sampled image frame, having been generated at a first time point, with a second input image frame corresponding to a super-sampling target for a second time point to generate a merged image; and determine network input data by decreasing a bit-precision of the merged image, and a second processor configured to:

generate network output data by executing a super-sampling neural network model based on the network input data, wherein the first processor is further configured to generate a second super-sampled image frame by performing a super-sampling operation at the second time point that includes increasing a bit-precision of the network output data, wherein, according to an asynchronous pipeline method, the first super-sampled image frame is displayed at the second time point instead of the first time point, and wherein the second super-sampled image frame is displayed at a third time point instead of the second time point.

12. The electronic device of claim 11, wherein, to generate the merged image, the first processor is further configured to:

generate the merged image by mixing pixels of the first super-sampled image frame and pixels of the second input image frame based on determined change data; and determine the change data corresponding to a change between the second input image frame and a first input image frame corresponding to a super-sampling target at the first time point.

13. The electronic device of claim 12, wherein the first processor is further configured to:

apply a corresponding pixel of the second input image frame to a position satisfying a replacement condition among pixel positions of the merged image, and warp and apply a corresponding pixel of the first super-sampled image frame to a position violating the replacement condition among the pixel positions of the merged image using the change data.

14. The electronic device of claim 11, wherein the first processor is further configured to:

generate a first temporary image having a narrower dynamic range than the merged image by performing tone mapping on the merged image, and generate a second temporary image having lower bit-precision than the first temporary image by performing data type conversion on the first temporary image.

15. The electronic device of claim 14, wherein the first processor is configured to:

determine network input data based on the decreased bit-precision;

store the network input data is stored in a first memory space of the first processor; and duplicate the network input data from the first memory space to a second memory space of the second processor while an operation of the first processor is stopped.

16. A processor-implemented method, the method comprising:

generating, by a first processor, a merged image by merging a first super-sampling image result at a first time point with a second image target at a second time point; and generating a super-sampled second output image at the second time point by increasing, by the first processor, a bit-precision provided by a super-sampling neural network that is executed by a second processor and provided with a decreased bit-precision image of the merged image, wherein, according to an asynchronous pipeline method, the first super-sampling image result is displayed at the second time point instead of the first time point when the first super-sampling image result was generated, and wherein the super-sampled second output image is displayed at a third time point instead of the second time point.

17. The method of claim 16, wherein the merging comprises:

determining change data corresponding to a change between the second image target and a super-sampling target at the first time point; and mixing pixels of the first super-sampling image result and pixels of the second image target based on the change data to determine the merged image.

* * * * *